(12) United States Patent
Fujii et al.

(10) Patent No.: US 10,196,552 B2
(45) Date of Patent: *Feb. 5, 2019

(54) COMPOSITION FOR HEAT CYCLE SYSTEM, AND HEAT CYCLE SYSTEM

(71) Applicant: ASAHI GLASS COMPANY, LIMITED, Chiyoda-ku (JP)

(72) Inventors: Katsuya Fujii, Chiyoda-ku (JP); Hiroshi Yamamoto, Chiyoda-ku (JP); Katsuya Ueno, Chiyoda-ku (JP); Hidekazu Okamoto, Chiyoda-ku (JP); Masato Fukushima, Chiyoda-ku (JP); Hiroaki Mitsuoka, Chiyoda-ku (JP); Mai Tasaka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,769

(22) Filed: Jul. 29, 2016

(65) Prior Publication Data

US 2016/0333245 A1    Nov. 17, 2016

Related U.S. Application Data

(63) Continuation of application No. PCT/JP2015/054640, filed on Feb. 19, 2015.

(30) Foreign Application Priority Data

Feb. 20, 2014  (JP) ................................ 2014-030857
Mar. 7, 2014   (JP) ................................ 2014-044905
Jun. 23, 2014  (JP) ................................ 2014-128242

(51) Int. Cl.
*C09K 5/04*      (2006.01)
*C10M 171/00*    (2006.01)
(Continued)

(52) U.S. Cl.
CPC ........... *C09K 5/045* (2013.01); *C10M 105/04* (2013.01); *C10M 105/18* (2013.01);
(Continued)

(58) Field of Classification Search
CPC .............. C09K 2205/126; C09K 5/045; C09K 2205/22; C09K 2205/24
See application file for complete search history.

(56) References Cited

U.S. PATENT DOCUMENTS 7,017,898 B2    3/2006  Varzino et al.
9,725,632 B2 *  8/2017  Ueno .................... C09K 5/045
(Continued)

FOREIGN PATENT DOCUMENTS

CN    102791840 A    11/2012
EP    3 101 082 A1   12/2016
(Continued)

OTHER PUBLICATIONS

International Search Report dated Apr. 21, 2015 in PCT/JP2015/054640, filed on Feb. 19, 2015.
(Continued)

*Primary Examiner* — John R Hardee
(74) *Attorney, Agent, or Firm* — Oblon, McClelland, Maier & Neustadt, L.L.P.

(57) ABSTRACT

To provide a composition for a heat cycle system having less influence over the ozone layer, having a low global warming potential and having excellent durability, and a heat cycle system.

A composition for a heat cycle system comprising a working fluid containing trifluoroethylene and difluoromethane, and a lubricating oil, wherein the interaction distance ($Ra_{1123}$) between trifluoroethylene and the lubricating oil as deter-
(Continued)

mined from the Hansen solubility parameters is shorter than the interaction distance ($Ra_{32}$) between difluoromethane and the lubricating oil.

20 Claims, 1 Drawing Sheet

(51) Int. Cl.
| | |
|---|---|
| C10M 105/04 | (2006.01) |
| C10M 105/18 | (2006.01) |
| C10M 105/36 | (2006.01) |
| C10M 105/38 | (2006.01) |
| C10M 105/52 | (2006.01) |
| F25B 31/00 | (2006.01) |
| F25B 43/00 | (2006.01) |
| C10M 105/32 | (2006.01) |
| C10M 105/50 | (2006.01) |
| C10M 107/32 | (2006.01) |
| C10M 107/34 | (2006.01) |
| C10M 107/38 | (2006.01) |

(52) U.S. Cl.
CPC ........ *C10M 105/36* (2013.01); *C10M 105/38* (2013.01); *C10M 105/52* (2013.01); *C10M 171/00* (2013.01); *C10M 171/008* (2013.01); *F25B 31/002* (2013.01); *F25B 43/00* (2013.01); *C09K 5/04* (2013.01); *C09K 2205/122* (2013.01); *C09K 2205/126* (2013.01); *C09K 2205/22* (2013.01); *C10M 105/32* (2013.01); *C10M 105/50* (2013.01); *C10M 107/32* (2013.01); *C10M 107/34* (2013.01); *C10M 107/38* (2013.01); *C10M 2203/024* (2013.01); *C10M 2207/0406* (2013.01); *C10M 2207/2825* (2013.01); *C10M 2207/2835* (2013.01); *C10M 2211/0225* (2013.01); *C10N 2220/302* (2013.01); *C10N 2240/30* (2013.01); *F25B 2500/222* (2013.01)

(56) References Cited

U.S. PATENT DOCUMENTS

| | | | |
|---|---|---|---|
| 2010/0090156 A1 | 4/2010 | Nappa et al. | |
| 2012/0132848 A1* | 5/2012 | Sawada | C09K 5/045 252/68 |
| 2013/0012420 A1* | 1/2013 | Matsumoto | C09K 5/045 508/569 |
| 2014/0077122 A1 | 3/2014 | Fukushima | |
| 2014/0374647 A1* | 12/2014 | Saito | C09K 5/042 252/68 |

FOREIGN PATENT DOCUMENTS

| | | | |
|---|---|---|---|
| JP | 2012-505296 | | 3/2012 |
| JP | 2015-174917 A | | 10/2015 |
| JP | 2015-214930 A | | 12/2015 |
| WO | WO 2011/118733 | * | 9/2011 |
| WO | WO 2012/157763 A1 | | 11/2012 |
| WO | WO 2012/157764 A1 | | 11/2012 |
| WO | WO2013/100100 | * | 7/2013 |
| WO | WO 2015/005290 A1 | | 1/2015 |

OTHER PUBLICATIONS

Fizika Goreniya i Vzryva, 2006, vol. 42(2006), No. 2, 4 Pages.
Office Action dated Apr. 13, 2018 in Chinese Patent Application No. 201580009624.2 (submitting English language translation only).
Yuan Xiulin, et al., "Theorectical Application and New Technology of Modern Refrigeration and Air-condition", Xian Jiaotong University Publishing House, 2009, p. 29.
Shi Sengseng, "Abrasion resistant Coating Material and Technology", Chemical Industry Publishing House, 2003, 2 pages.

* cited by examiner

US 10,196,552 B2

COMPOSITION FOR HEAT CYCLE SYSTEM, AND HEAT CYCLE SYSTEM

This application is a continuation of PCT Application No. PCT/JP2015/054640 filed on Feb. 19, 2015, which is based upon and claims the benefit of priority from Japanese Patent Application No. 2014-030857 filed on Feb. 20, 2014, Japanese Patent Application No. 2014-044905 filed on Mar. 7, 2014 and Japanese Patent Application No. 2014-128242 filed on Jun. 23, 2014. The contents of those applications are incorporated herein by reference in their entireties.

TECHNICAL FIELD

The present invention relates to a composition for a heat cycle system, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used. However, although HFCs have less influence over the ozone layer, it is pointed out that they may cause global warming since they have a high global warming potential (hereinafter referred to as GWP). Accordingly, as a working fluid for a heat cycle system, development of a working fluid having little influence over the ozone layer and having a low GWP is urgently needed.

In recent years, as a working fluid for a heat cycle system, a hydrofluoroolefin (HFO) having a carbon-carbon double bond which is likely to be decomposed by OH radicals in the air and thereby having less influence over the ozone layer, and having a low global warming potential, has been proposed.

As a working fluid employing such a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs or HFOs in combination for the purpose of increasing the flame retardancy, cycle performance, etc. of the working fluid.

However, HFO-1123 is a compound having an unsaturated bond in its molecule and is a compound having a very short life in the air, and accordingly under conditions under which compression and heating are repeatedly carried out in a heat cycle, it is likely to be decomposed and is inferior in the stability to HFCs and HCFCs which are saturated compounds in some cases. An acid generated by decomposition of HFO-1123 in the heat cycle system may cause deterioration of a lubricating oil.

Further, HFO-1123 may undergo self-decomposition reaction under high temperature and high pressure conditions, and if a composition containing HFO-1123 is practically used, improvement of durability of a working fluid using HFO-1123 should be achieved.

Under these circumstances, a method for efficiently operating a heat cycle system employing HFO-1123 as a working fluid, with lubricity maintained while excellent cycle performance of HFO-1123 is sufficiently made use of, has been desired.

PRIOR ART DOCUMENT

Patent Document

Patent Document 1: WO2012/157764

DISCLOSURE OF INVENTION

Technical Problem

The object of the present invention is to provide a composition for a heat cycle system which has less influence over the ozone layer, which has a low GWP and which is excellent in the durability, and a heat cycle system.

Solution to Problem

The present invention provides a composition for a heat cycle system, and a heat cycle system of the following [1] to [13].

[1] A composition for a heat cycle system comprising a working fluid containing trifluoroethylene and difluoromethane, and a lubricating oil, wherein the interaction distance ($Ra_{1123}$) between trifluoroethylene and the lubricating oil as determined from the Hansen solubility parameters is shorter than the interaction distance ($Ra_{32}$) between difluoromethane and the lubricating oil.

[2] The composition for a heat cycle system according to [1], wherein the difference ($Ra_{32}-Ra_{1123}$) between the interaction distance ($Ra_{1123}$) and the interaction distance ($Ra_{32}$) is at least 1.

[3] The composition for a heat cycle system according to [1] or [2], wherein the lubricating oil is at least one member selected from the group consisting of an ester lubricating oil, a polyglycol oil and a fluorinated lubricating oil.

[4] The composition for a heat cycle system according to any one of [1] to [3], wherein the mass ratio of the working fluid to the lubricating oil is from 1/10 to 10/1.

[5] The composition for a heat cycle system according to any one of [1] to [4], wherein the mass ratio represented by trifluoroethylene/difluoromethane in the working fluid is from 1/99 to 99/1.

[6] The composition for a heat cycle system according to any one of [1] to [5], wherein the proportion of the content of trifluoroethylene in the working fluid is at least 10 mass % based on the entire amount of the working fluid.

[7] The composition for a heat cycle system according to any one of [1] to [6], wherein the total amount of trifluoroethylene and difluoromethane in the working fluid is at least 70 mass % per 100 mass % of the working fluid.

[8] The composition for a heat cycle system according to any one of [1] to [7], wherein the working fluid further contains at least one hydrofluoroolefin selected from 2,3,3,3-tetrafluoropropene, trans-1,3,3,3-tetrafluoropropene and cis-1,3,3,3-tetrafluoropropene.

[9] The composition for a heat cycle system according to [8], wherein the interaction distance between the hydrofluoroolefin and the lubricating oil is equal to or longer than the interaction distance ($Ra_{1123}$) between trifluoroethylene and the lubricating oil.

[10] The composition for a heat cycle system according to any one of [1] to [7], wherein the working fluid further contains 2,3,3,3-tetrafluoropropene.

[11] The composition for a heat cycle system according to [10], wherein the difference ($Ra_{1234yf}$-$Ra_{1123}$) between the interaction distance ($Ra_{1234yf}$) between 2,3,3,3-tetrafluoropropene and the lubricating oil and the interaction distance ($Ra_{1123}$) is at least 0.

[12] A heat cycle system, which employs the composition for a heat cycle system as defined in any one of [1] to [11].

[13] The heat cycle system according to [12], which is a refrigerating apparatus, an air-conditioning apparatus, a power generation system, a heat transport apparatus or a secondary cooling machine.

Advantageous Effects of Invention

The composition for a heat cycle system of the present invention has less influence over the ozone layer, has a low GWP and is excellent in the durability.

Further, the heat cycle system of the present invention, which employs the composition for a heat cycle system of the present invention, has less influence over the ozone layer, has a low GWP, and is excellent in the durability.

DESCRIPTION OF EMBODIMENT

Figure 1:
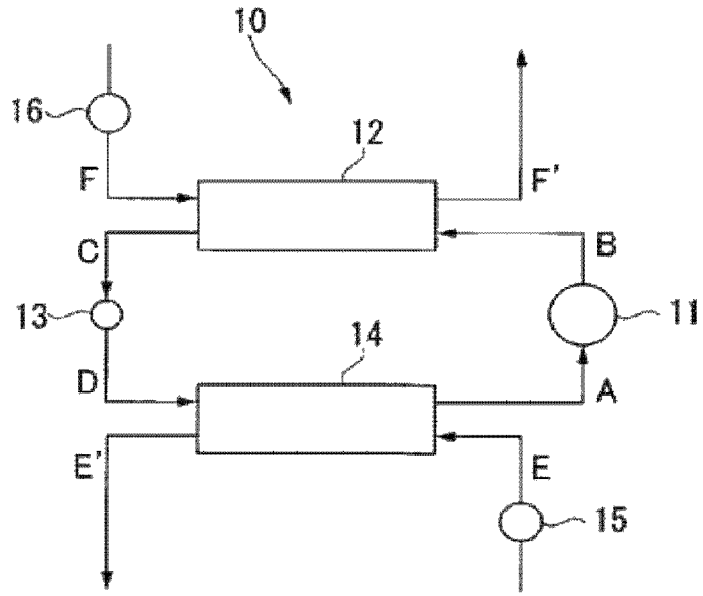
FIG. 1 is a schematic construction view illustrating a refrigerating cycle system as an example of a heat cycle system of the present invention.

In this specification, GWP is a value (100 years) in Intergovernmental Panel on Climate Change (IPCC), Fourth assessment report (2007), or a value measured in accordance therewith.

[Composition for Heat Cycle System]

The composition for a heat cycle system of the present invention comprises a working fluid containing trifluoroethylene (HFO-1123) and difluoromethane (HFC-32) and a lubricating oil and as the case requires, may further contain a stabilizer, a leak detecting substance, etc.

As a heat cycle system to which the composition for a heat cycle system of the present invention is applied, a heat cycle system by a heat exchanger such as a condenser or an evaporator may be used without any particular restriction. The heat cycle system, for example, a refrigerating cycle system, has a mechanism in which a gaseous working fluid gas is compressed by a compressor and cooled by a condenser to form a high pressure liquid, the pressure of the liquid is lowered by an expansion valve, and the liquid is vaporized at low temperature by an evaporator so that heat is removed by the heat of vaporization.

When HFO-1123 is used as a working fluid for such a heat cycle system, HFO-1123 may undergo self-decomposition reaction under specific temperature conditions or pressure conditions. The composition for a heat cycle system of the present invention, which comprises HFC-32 and a specific lubricating oil in combination, can exhibit cycle performance safely while self-decomposition reaction of HFO-1123 is suppressed.

Now, components contained in the composition for a heat cycle system of the present invention will be described.

<Working Fluid>

The working fluid in the present invention contains HFO-1123 and HFC-32 and may further contain another working fluid as the case requires.

HFO-1123 used for the working fluid of the present invention is known to undergo chain self-decomposition reaction involving a rapid temperature and pressure increase at high temperature or with an ignition source under high pressure when used by itself. In the present invention, the working fluid is a mixture of HFO-1123 with HFC-32 with a lowered content of HFO-1123, whereby the self-decomposition reaction can be prevented.

In a case where the working fluid for heat cycle of the present invention is applied to a heat cycle system, the pressure conditions are usually at a level of 5.0 MPa or lower. Accordingly, by the working fluid for heat cycle comprising HFO-1123 and HFC-32 having no self-decomposition property under a pressure of 5.0 MPa, a working fluid having high durability under conventional temperature conditions when applied to a heat cycle system, can be obtained.

Further, considering a case where a contingency such as a breakdown of a heat cycle system apparatus arises, by the composition having no self-decomposition property under a pressure of about 7.0 MPa, a working fluid with higher durability can be obtained.

The working fluid in the present invention, even having a composition with self-decomposition property, may be used for a heat cycle system with careful handling depending upon the conditions of use.

The mass ratio (HFO-1123/HFC-32) of HFO-1123 to HFC-32 in the working fluid is preferably from 1/99 to 99/1 in view of a low GWP of the working fluid and an excellent cycle performance. Further, the proportion of HFO-1123 in the working fluid is more preferably at least 10 mass %. Further, with a view to suppressing self-decomposition reaction of HFO-1123, the mass ratio of HFO-1123/HFC-32 is more preferably from 20/80 to 80/20, particularly preferably from 40/60 to 60/40.

HFO-1123 and HFC-32 form a pseudoazeotropic mixture in an optional range.

Accordingly, the working fluid in the present invention has a very small temperature glide. Here, the temperature glide is an index to a difference of the composition between a liquid phase and a gaseous phase of a working fluid in the form of a mixed working fluid. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture with a large temperature glide. Accordingly, when a mixture is used as a working fluid, a working fluid with an appropriate temperature glide is desired.

Further, with a pseudoazeotropic mixture, even if the working fluid leaks out from the heat cycle system, a recovery of the working fluid composition to an initial state will easily be achieved without change of the working fluid composition in the heat cycle system.

In the working fluid (100 mass %) in the present invention, the proportion of the total amount of HFO-1123 and HFC-32 is preferably at least 70 mass %, more preferably at least 80 mass %, particularly preferably at least 90 mass %. If the proportion of the total amount of HFO-1123 and HFC-32 is within the above range, a working fluid with a very small composition change, with a small temperature glide and with an excellent balance of properties such as GWP will be obtained.

GWP of the working fluid as a whole containing HFO-1123 (GWP: 0.3) and HFC-32 (GWP: 675) is preferably at most 400, more preferably at most 385, particularly preferably at most 340 in view of the influence over global warming. GWP of a mixture is represented by a weighted average by the composition mass.

The working fluid in the present invention may contain a compound commonly used as a working fluid, other than HFO-1123 and HFC-32, within a range not to impair the effects of the present invention.

Such another compound may, for example, be a HFC other than HFC-32, a HFO (a HFC having a carbon-carbon double bond) other than HFO-1123, or another component which is vaporized and liquefied together with HFO-1123 and HFC-32. Such another compound is preferably a HFC other than HFC-32 and a HFO other than HFO-1123.

A HFC other than HFC-32 is preferably a $C_{1-5}$ HFC in view of less influence over the ozone layer and a low GWP. The HFC may be linear, branched or cyclic.

The HFC other than HFC-32 may, for example, be difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent cycle performance, preferred is 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, and more preferred is HFC-32, HFC-152a, HFC-134a or HFC-125.

The HFC may be used alone or in combination of two or more.

In a case where the working fluid contains a HFC other than HFC-32, its content is less than 30 mass %, preferably from 1 to 25 mass %, further preferably from 3 to 20 mass % per 100 mass % of the working fluid. If the content of the HFC other than HFC-32 is at least the lower limit, more favorable cycle performance will be obtained.

As the HFO other than HFO-1123, the HFO as an optional component other than HFO-1123 is also preferably selected from the same viewpoint as the above HFC. Here, GWP of the HFO even other than HFO-1123 is an order of magnitude lower than the HFC. Accordingly, as the HFO other than HFO-1123 used in combination with HFO-1123 is preferably selected properly particularly with a view to improving the cycle performance as the working fluid and maintaining the temperature glide within an appropriate range, rather than considering GWP.

The HFO other than HFO-1123 may, for example, be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO other than HFO-1123 is, in view of a high critical temperature and excellent safety and cycle performance, preferably HFO-1234yf (GSP:4), HFO-1234ze(E) or HFO-1234ze(Z) (GSPs of both (E)-form and (Z)-form being 6), more preferably HFO-1234yf. It is considered that even when the working fluid of the present invention contains HFO-1234yf, HFO-1123 can be selectively dissolved in the lubricating oil, and a working fluid with a higher safety can be obtained.

The HFO other than HFO-1123 may be used alone or in combination of two or more.

In a case where the working fluid contains the HFO other than HFC-1123, its content is less than 30 mass %, preferably from 1 to 30 mass %, more preferably from 3 to 20 mass % per 100 mass % of the working fluid. If the content of the HFC other than HFC-1123 is at least the lower limit, more favorable cycle performance will be obtained.

In a case where the working fluid comprises HFO-1123, HFC-32 and HFO-1234yf, it is preferred that in the working fluid, the proportion of HFO-1123 is from 20 to 80 mass %, the proportion of HFC-32 is from 20 to 80 mass %, and the proportion of HFO-1234yf is from 1 to 30 mass %. Within the above ranges, an excellent cycle performance will be obtained while self-decomposition reaction of HFO-1123 is suppressed.

In a case where the working fluid comprises HFO-1123, HFC-32 and HFO-1234ze(E), it is preferred that in the working fluid, the proportion of HFO-1123 is from 20 to 80 mass %, the proportion of HFC-32 is from 20 to 80 mass %, and the proportion of HFO-1234ze(E) is from 1 to 30 mass %. Within the above ranges, an excellent cycle performance will be obtained while self-decomposition reaction of HFO-1123 is suppressed.

Another compound which is vaporized and liquefied together with HFO-1123 and HFC-32 may, for example, be carbon dioxide, a hydrocarbon, a chlorofluoroolefin (CFO) or a hydrochlorofluoroolefin (HCFO).

In a case where the working fluid contains carbon dioxide, its content is less than 30 mass %, preferably from 1 to 25 mass %, more preferably from 3 to 20 mass % per 100 mass % of the working fluid. When the content of carbon dioxide is at least the lower limit, the working pressure will be decreased, and the cost of the heat cycle system can be reduced.

The hydrocarbon may, for example, be propane, propylene, cyclopropane, butane, isobutane, pentane or isopentane. The hydrocarbon may be used alone or in combination of two or more.

In a case where the working fluid contains the hydrocarbon, its content is less than 10 mass %, preferably from 1 to 5 mass %, more preferably from 3 to 5 mass % per 100 mass % of the working fluid. When the content of the hydrocarbon is at least the lower limit, the compatibility of a mineral lubricating oil with the working fluid will be more favorable.

The CFO may, for example, be chlorofluoropropene or chlorofluoroethylene, and with a view to suppressing flammability of the working fluid without significantly decreasing the cycle performance of the working fluid, it is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112). The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid contains the HCFO, the content of the HCFO per 100 mass % of the working fluid is less than 1 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid of the present invention contains a working fluid other than the above HFC, HFO, carbon dioxide, hydrocarbon, CFO and HCFO, the total content of such other working fluids is less than 10 mass %, preferably at most 8 mass %, more preferably at most 5 mass % per 100 mass % of the working fluid.

<Lubricating Oil>

The lubricating oil in the present invention is characterized in that the interaction distance ($Ra_{1123}$) between HFO-1123 and the lubricating oil as determined from the Hansen solubility parameters (hereinafter sometimes referred to as HSP) is shorter than the interaction distance ($Ra_{32}$) between HFC-32 and the lubricating oil.

In this specification, HSP are represented by three parameters $\delta_D$, $\delta_P$ and $\delta_H$, each measured in the unit $(MPa)^{1/2}$, under a condition that the following formula (1) is satisfied. $\delta_D$ is HSP by an effect from dispersion forces between molecules, $\delta_P$ is HSP by an effect from dipolar intermolecular force between molecules, and $\delta_H$ is HSP by an effect from hydrogen bonds between molecules.

$$\delta^2 = \delta_D^2 + \delta_P^2 + \delta_H^2 \tag{1}$$

In this specification, the interaction distance (Ra) between two substances is a value calculated in accordance with the following formula (2):

$$(Ra) = \{(2\delta_{D1} - 2\delta_{D2})^2 + (\delta_{P1} - \delta_{P2})^2 + (\delta_{H1} - \delta_{H2})^2\}^{1/2} \tag{2}$$

In the formula (2), the subscripts 1 and 2 respectively represent the HSP of the substance 1 and the substance 2.

The definition and the calculation method of HSP and the interaction distance are disclosed in the following article.

Charles M. Hansen, Hansen Solubility Parameters: A Users Handbook (CRC Press, 2007)

According to the article, HSP of a mixture are determined from HSP of substances mixed and the volume mixture ratio in accordance with the following formulae (3) to (5).

$$\delta_{D,MIX} = (\delta_{D1} \times \varphi_1) + (\delta_{D2} \times \varphi_2) \tag{3}$$

$$\delta_{P,MIX} = (\delta_{P1} \times \varphi_1) + (\delta_{P2} \times \varphi_2) \tag{4}$$

$$\delta_{P,MIX} = (\delta_{H1} \times \varphi_1) + (\delta_{H2} \times \varphi_2) \tag{5}$$

In the formulae (3) to (5), φ represents the volume fraction at the time of mixing, and the subscripts 1, 2 and MIX respectively represent the substance 1, the substance 2 and the mixture.

In a case where the lubricating oil in this specification is a mixture comprising at least two components, HSP of the lubricating oil are calculated in accordance with the following formula (6) based on the formulae (3) to (5).

$$\delta_{D,MIX} = \sum_{n=1}^{x} (\delta_{D,n} \times \phi_n) \tag{6}$$

$$\delta_{P,MIX} = \sum_{n=1}^{x} (\delta_{P,n} \times \phi_n) \tag{7}$$

$$\delta_{H,MIX} = \sum_{n=1}^{x} (\delta_{H,n} \times \phi_n) \tag{8}$$

In the formulae (6) to (8), φ represents the volume fraction at the time of mixing, x represents the total number of types of the substances mixed, and the subscripts n and MIX respectively represent the substance n and the mixture.

HSP ($\delta_D$, $\delta_P$ and $\delta_H$) can easily be estimated from the chemical structure by using, for example, computer software Hansen Solubility Parameter in Practice (HSPiP).

From the HSP theory, the present inventors have searched for a lubricating oil suitable for a working fluid containing HFO-1123 and HFC-32. In general, ones having HFS close to each other tend to be soluble in each other. Accordingly, in the present invention, it is considered that when the interaction distance ($Ra_{1123}$) between HFO-1123 and the lubricating oil is smaller than the interaction distance ($Ra_{32}$) between HFC-32 and the lubricating oil, HFO-1123 can be selectively dissolved in the lubricating oil in the present invention.

In the heat cycle system, when HFO-1123 contained in the working fluid can be selectively dissolved, the proportion of HFO-1123 in a gaseous phase can be kept low. As a result, it is considered that the thermal energy generated by self-decomposition reaction of HFO-1123 will not propagate to other HFO-1123 molecules, and a chain self-decomposition reaction can be suppressed.

That is, it is considered that when the interaction distance ($Ra_{1123}$) is shorter than the interaction distance ($Ra_{32}$), a chain self-decomposition reaction of HFO-1123 can be suppressed, and the durability of the composition for a heat cycle system will improve.

The interaction distance ($Ra_{1123}$) is preferably from 0 to 9, more preferably from 0 to 6, particularly preferably from 0 to 3. The shorter the interaction distance ($Ra_{1123}$) is, the more HFO-1123 will be dissolved in the lubricating oil and the more excellent the lubricity in the heat cycle system is.

The interaction distance ($R_{32}$) is preferably at least 6, more preferably at least 9, particularly preferably at least 12. When the interaction distance ($Ra_{32}$) is within the above range, HFC-32 will be hardly soluble in the lubricating oil, and excellent lubricity in the heat cycle system will be obtained.

The difference ($Ra_{32}$-$Ra_{1123}$) between the interaction distance ($Ra_{1123}$) and the interaction distance ($Ra_{32}$) is larger than 0, preferably at least 1, more preferably at least 3, particularly preferably at least 6. When the difference ($Ra_{32}$-$Ra_{1123}$) between the interaction distances is within the above range, the lubricating oil is excellent in the compatibility with the working fluid, and HFO-1123 can be selectively dissolved than HFC-32.

In a case where the working fluid contains another working fluid such as the above HFC or HFO, in addition to HFO-1123 and HFC-32, the interaction distance between such another working fluid and the lubricating oil is preferably equal to or longer than the interaction distance ($Ra_{1123}$) between HFO-1123 and the lubricating oil. For example, in a case where another working fluid is HFO-1234yf, ($Ra_{1234yf}$-$Ra_{1123}$) is preferably larger than 0, where $Ra_{1234yf}$ is the interaction distance between the lubricating oil and HFO-1234yf.

Here, the reason why the lubricating oil is required to have compatibility with the working fluid is that in the heat cycle system, the lubricating oil circulates together with the working fluid through the heat cycle system. For example, in a refrigerating apparatus, if the compatibility between the working fluid and the lubricating oil is insufficient, the lubricating oil discharged from a refrigerant compressor tends to remain in the cycle. As a result, the amount of the lubricating oil in the refrigerant compressor tends to be decreased, thus leading to friction due to lubricity failure or clogging of an expansion mechanism such as a capillary.

In the composition for a heat cycle system of the present invention, since HFO-1123 is selectively dissolved in the lubricating oil than HFC-32, the proportion of HFC-1123 in a gaseous phase can be decreased even if the composition of the working fluid as a whole circulating in the heat cycle system is constant. Accordingly, even if the proportion of HFC-32 in the working fluid is low, self-decomposition reaction of HFC-1123 can be suppressed, and a further decrease of GWP can be achieved.

The lubricating oil may, for example, be an oxygen-containing synthetic oil (such as an ester lubricating oil or a polyglycol oil), a fluorinated lubricating oil, a silicone oil, a mineral oil or a hydrocarbon synthetic oil. Among them, in view of excellent compatibility with the working fluid, preferred is at least one member selected from the group consisting of an ester lubricating oil, a polyglycol oil and a fluorinated lubricating oil.

(Ester Lubricating Oil)

As the ester lubricating oil, a dibasic acid ester oil, a polyol ester oil of a polyol and a fatty acid, a complex ester oil of a polyol, a polybasic acid and a monohydric alcohol (or a fatty acid), a polyol carbonate ester oil or the like may be mentioned.

(Dibasic Acid Ester Oil)

The dibasic acid ester oil is preferably an ester of a $C_{5-10}$ dibasic acid (such as glutaric acid, adipic acid, pimelic acid, suberic acid, azelaic acid or sebacic acid) with a $C_{2-15}$ monohydric alcohol which is linear or has a branched alkyl group (such as ethanol, propanol, butanol, pentanol, hexanol, heptanol, octanol, nonanol, decanol, undecanol, dodecanol, tridecanol, tetradecanol or pentadecanol). Specifically, preferred is dipentadecyl glutarate, di(2-ethylhexyl) azelate, dipentadecyl adipate, dipentadecyl suberate or diethyl sebacate.

(Polyol Ester Oil)

The polyol ester oil is an ester synthesized from a polyhydric alcohol and a fatty acid (a carboxylic acid), in a carbon/oxygen molar ratio of at least 2 and at most 7.5, preferably at least 3.2 and at most 5.8.

The polyhydric alcohol constituting the polyol ester oil may be a diol (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol), a polyol having from 3 to 20 hydroxy groups (such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, a polyhydric alcohol such as adonitol, arabitol, xylitol or mannitol, a saccharide such as xylose, arabinose, ribose, rhamnose, glucose, fructose, galactose, mannose, sorbose, cellobiose, maltose, isomaltose, trehalose, sucrose, raffinose, gentianose or melezitose, or a partially etherified product thereof), and the polyhydric alcohol constituting the ester may be used alone or in combination of two or more.

The number of carbon atoms in the fatty acid constituting the polyol ester oil is not particularly limited, but usually a $C_{1-24}$ fatty acid is employed. A linear fatty acid or a branched fatty acid is preferred. The linear fatty acid may, for example, be acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid or linolenic acid, and the hydrocarbon group bonded to the carboxy group may be a totally saturated hydrocarbon or may have an unsaturated hydrocarbon. Further, the branched fatty acid may, for example, be 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-m ethyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5- dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid or 2,2-diisopropylpropanoic acid. The ester may be an ester of one or more of such fatty acids.

The polyol constituting the ester may be used alone or as a mixture of two or more. Further, the fatty acid constituting the ester may be a single component or may be two or more types. Further, the fatty acid may be used alone or as a mixture of two or more. Further, the polyol ester oil may have a free hydroxy group.

Specifically, the polyol ester oil is more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol) or tri-(pentaerythritol), further preferably an ester of neopentyl glycol, trim ethylolethane, trimethylolpropane, trimethylolbutane, pentaerythritol or di-(pentaerythritol), particularly preferably an ester of a $C_{2-20}$ fatty acid and neopentyl glycol, trimethylolpropane, pentaerythritol, di-(pentaerythritol) or the like.

The fatty acid constituting such a polyhydric alcohol fatty acid ester may be only a fatty acid having a linear alkyl group or may be selected from fatty acids having a branched structure. Otherwise, it may be a mixed ester of linear and branched fatty acids. Further, the fatty acid constituting the ester may be used in combination of two or more selected from the above fatty acids.

As specific examples, in the case of a mixed ester of linear and branched fatty acids, the molar ratio of a $C_{4-6}$ linear fatty acid to a $C_{7-9}$ branched fatty acid is from 15:85 to 90:10, preferably from 15:85 to 85:15, more preferably from 20:80 to 80:20, further preferably from 25:75 to 75:25, most preferably from 30:70 to 70:30. Further, based on the entire amount of fatty acids constituting a polyhydric alcohol fatty acid ester, the proportion of the total amount of a $C_{4-6}$ linear fatty acid and a $C_{7-9}$ branched fatty acid is at least 20 mol %. The fatty acid composition should be determined so as to satisfy both sufficient compatibility with the working fluid and viscosity required as the lubricating oil. The proportion of the fatty acid here is based on the entire amount of fatty acids constituting a polyhydric alcohol fatty acid ester contained in the lubricating oil.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or a sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

(Complex Ester Oil)

The complex ester oil is an ester of a fatty acid and a dibasic acid, with a monohydric alcohol and a polyol. The fatty acid, the dibasic acid, the monohydric alcohol and the polyol may be as defined above.

(Polyol Carbonate Oil)

The polyol carbonate oil is an ester of carbonic acid and a polyol.

The polyol may, for example, be a polyglycol (such as polyalkylene glycol, its ether compound, a modified compound thereof) obtained by homopolymerizing or copolymerizing a diol (as described above), a polyol (as described above), or one having a polyglycol added to a polyol.

The polyalkylene glycol may, for example, be one obtained by polymerizing a $C_{2-4}$ alkylene oxide (such as ethylene oxide or propylene oxide) using water or an alkali hydroxide as an initiator.

One molecule of the polyalkylene glycol may contain single oxyalkylene units or two or more types of oxyalkylene units. It is preferred that at least oxypropylene units are contained in one molecule. Further, the polyol carbonate oil may be a ring-opening polymer of a cyclic alkylene carbonate.

(Polyglycol Oil)

The polyglycol oil is preferably a polyalkylene glycol oil based on a polyalkylene glycol. The polyalkylene glycol may be a compound having a $C_{2-4}$ alkylene oxide added to a monohydric or polyhydric alcohol (such as methanol, butanol, pentaerythritol or glycerol), or a hydroxy group-initiated polyalkylene glycol. Further, it may be one having the terminal of the hydroxy group-initiated polyalkylene glycol capped with an alkyl group such as a methyl group. More specifically, the polyglycol oil is preferably a polyoxypropylene monool having a structure represented by $R^1$—O—$(CH_2CH(CH_3)O)_n$—H. Here, $R^1$ is an alkyl group, and n represents the degree of polymerization. $R^1$ is preferably an alkyl group having at least 6 carbon atoms. n is preferably from 6 to 80.

(Fluorinated Lubricating Oil, Silicone Oil)

The fluorinated lubricating oil may, for example, be a compound having hydrogen atoms of a synthetic oil (such as the after-mentioned mineral oil, poly-α-olefin, polyglycol or alkylnaphthalene) substituted by fluorine atoms, a perfluoropolyether oil or a fluorinated silicone oil. The fluorinated lubricating oil may further contain a chlorine atom. The fluorinated lubricating oil may be specifically polychlorotrifluoroethylene which is a polymer of chlorotrifluoroethylene. The degree of polymerization of chlorotrifluoroethylene in the polychlorotrifluoroethylene is preferably from 2 to 15.

The silicone oil is not particularly limited so long as it has a siloxane bond.

(Mineral Oil)

The mineral oil may, for example, be a naphthene mineral oil or a paraffin mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

(Hydrocarbon Synthetic Oil)

The hydrocarbon synthetic oil may, for example, be an olefin synthetic oil such as poly-α-olefin, or an alkylnaphthalene.

The poly-α-olefin may be one obtained by polymerizing a hydrocarbon monomer having an olefinic double bond. The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The lubricating oil may be used alone or in combination of two or more.

The lubricating oil is preferably a polyol ester oil and/or a polyglycol oil in view of the compatibility with the working fluid, and is particularly preferably a polyalkylene glycol oil with a view to obtaining a remarkable antioxidant effect by the after-mentioned stabilizer. The kinematic viscosity of the lubricating oil at 40° C. is preferably from 1 to 750 mm$^2$/s, more preferably from 1 to 400 mm$^2$/s. Further, the kinematic viscosity at 100° C. is preferably from 1 to 100 mm$^2$/s, more preferably from 1 to 50 mm$^2$/s.

In the composition for a heat cycle system, the mass ratio of the working fluid to the lubricating oil should be within a range not to remarkably deteriorate the effects of the present invention and varies depending upon the purpose of application, the form of the compressor, etc., and is preferably from 1/10 to 10/1, more preferably from 1/3 to 3/1, particularly preferably from 2/3 to 3/2.

<Stabilizer>

The stabilizer is a component which improves the stability of the working fluid against heat and oxidation. The stabilizer may, for example, be an oxidation resistance-improving agent, a heat resistance-improving agent or a metal deactivator.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2, 6-di-(t-butyl)phenol or 4,4'-methylenebis(2,6-di-t-butylphenol).

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of the stabilizer is not limited within a range not to remarkably decrease the effects of the present invention, and is preferably at most 5 mass %, more preferably at most 1 mass % in the composition for a heat cycle system (100 mass %).

The stabilizer may be used alone or in combination of two or more.

<Leak Detecting Substance>

The leak detecting substance may, for example, be an ultraviolet fluorescent dye, an odor gas or an odor masking agent. The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by mass, more preferably at most 0.5 part by mass per 100 parts by mass of the working fluid.

(Function and Effects)

The composition for a heat cycle system of the present invention, which comprises both a working fluid containing HFO-1123 and HFC-32 and a specific lubricating oil, has less influence over the ozone layer, has a low GWP and can prevent self-decomposition of HFO-1123, and is thereby excellent in durability.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by

Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Among them, the heat cycle system of the present invention, which efficiently exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as an example of the heat cycle system according the embodiment of the present invention, a refrigerating cycle system will be described with reference to a refrigerating cycle system 10 which has been roughly described above, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy chart (curve) as shown in FIG. 2, may be represented as a trapezoid having points A, B, C and D as vertexes.

Figure 2:
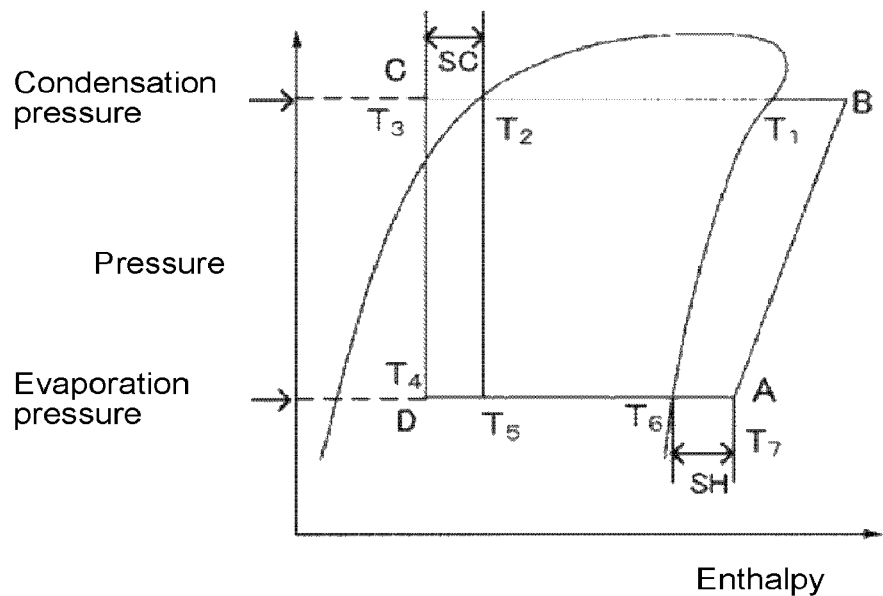
FIG. 2 is a cycle diagram illustrating the state change of a working fluid in a refrigerating cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy chart and the BC line, the intersection point $T_1$ on the high enthalpy side is the condensing temperature, and the intersection point $T_2$ on the low enthalpy side is the condensation boiling point temperature. Here, the temperature glide in a case where a mixed fluid is a non-azeotropic mixture fluid, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (A) and (B) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \quad (A)$$

$$COP = Q/\text{compression work} = (h_A - h_D)/(h_B - h_A) \quad (B)$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

(Moisture Concentration)

A problem such that moisture is included in the heat cycle system may occur. Inclusion of moisture may occur due to freezing in a capillary tube, hydrolysis of the working fluid or the lubricating oil, deterioration of materials by an acid component formed in the cycle, formation of contaminants, etc. Particularly, the above-described polyalkylene glycol oil or polyol ester oil has extremely high moisture absorbing properties and is likely to undergo hydrolysis, and inclusion of moisture decreases properties of the lubricating oil and may be a great cause to impair the long term reliability of a compressor. Further, in an automobile air-conditioning system, moisture tends to be included from a refrigerant hose used for the purpose of absorbing vibration or a bearing of a compressor. Accordingly, in order to suppress hydrolysis of the lubricating oil, it is necessary to control the moisture concentration in the heat cycle system. The moisture concentration in the heat cycle system is preferably less than 10,000 ppm, more preferably less than 1,000 ppm, particularly preferably less than 100 ppm by the mass ratio based on the working fluid.

As a method of controlling the moisture concentration in the heat cycle system, a method of using a desiccating agent (such as silica gel, activated aluminum or zeolite) may be mentioned. The desiccating agent is preferably a zeolite desiccating agent in view of chemical reactivity of the desiccating agent and the working fluid, and the moisture absorption capacity of the desiccating agent.

The zeolite desiccating agent is, in a case where a lubricating oil having a large moisture absorption as compared with a conventional mineral refrigerant oil is used, preferably a zeolite desiccating agent containing a compound represented by the following formula (9) as the main component in view of excellent moisture absorption capacity.

$$M_{2/n}O \cdot Al_2O_3 \cdot xSiO_2 \cdot yH_2O \quad (9)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are particularly important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid for heat cycle. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from 0.5 to 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

(Oxygen Concentration)

Oxygen may be included in the heat cycle system. Since inclusion of oxygen may cause deterioration of the working fluid or the like, it is necessary to keep the oxygen concentration in the heat cycle system low. The oxygen concentration in the heat cycle system is preferably less than 10,000 ppm, more preferably less than 1,000 ppm, particularly preferably less than 100 ppm by the mass ratio based on the working fluid.

(Chlorine Concentration)

If chlorine is present in the heat cycle system, it may have undesirable effects such as formation of a deposit by a reaction with a metal, friction of a bearing, and decomposition of the working fluid or the lubricating oil.

The chlorine concentration in the heat cycle system is preferably at most 100 ppm, particularly preferably at most 500 ppm by the mass ratio based on the working fluid for heat cycle.

(Non-condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the lubricating oil and promotes their decomposition.

The non-condensing gas concentration is preferably at most 1.5 vol %, particularly preferably at most 0.5 vol % by the volume ratio based on the working fluid, in a gaseous phase of the working fluid.

(Function and Effects)

The above-described heat cycle system, which employs the composition for a heat cycle system of the present invention, has little influence over the ozone layer, has a low GWP and is excellent in durability.

EXAMPLES (Method for Calculation of Hansen Solubility Parameters (HSP))

HSP ($\delta_D$, $\delta_P$ and $\delta_H$) of HFO-1123, HFC-32, HFO-1234yf and the lubricating oils were in accordance with computer software Hansen Solubility Parameters in Practice (HSPiP). With respect to substances registered in the database of HSPiP version 4.1.04, the values in the database were employed, and with respect to solvents not registered in the database, values estimated from HSPiP version 4.1.04 were employed.

<Working Fluid>

HSP of HFO-1123, HFC-32 and HFO-1234yf were determined by the above method. The results are shown in Table 1.

TABLE 1

|  | $\delta_D$ | $\delta_P$ | $\delta_H$ |
| --- | --- | --- | --- |
| HFO-1123 | 13.5 | 3.1 | 2.7 |
| HFO-1234yF | 13.2 | 3.1 | 1.9 |
| HFC-32 | 15.6 | 9.4 | 9.1 |

<Lubricating Oil>

HSP of the following compounds as lubricating oils were determined. From HSP of each lubricating oil and HSP of HFO-1123, HFC-32 and HFO-1234yf, the interaction distance ($Ra_{1123}$) between each lubricating oil and HFO-1123, the interaction distance ($Ra_{32}$) between each lubricating oil and HFC-32, the interaction distance ($Ra_{1234yf}$) between each lubricating oil and HFO-1234yf, the difference ($Ra_{32}$-$Ra_{1123}$) between $Ra_{1123}$ and $Ra_{32}$, and the difference ($Ra_{1234yf}$-$Ra_{1123}$) between $Ra_{1123}$ and $Ra_{1234yf}$ were obtained. The results are shown in Tables 2 to 8.

(Ester Lubricating Oil)
Dibasic Acid Ester Oil

TABLE 2

| Ex. | Name and structural formula | R | n | $\delta_D$ | $\delta_P$ | $\delta_H$ | $Ra_{1123}$ | $Ra_{32}$ | $Ra_{1234yf}$ | $Ra_{32}$-$Ra_{1123}$ | $Ra_{1234yf}$-$Ra_{1123}$ |
|---|---|---|---|---|---|---|---|---|---|---|---|
| 1 | Dibasic acid ester oil | 2-Ethylhexyl | 6 | 16.2 | 2.4 | 3.3 | 5.48 | 9.17 | 6.20 | 3.69 | 0.72 |
| 2 | ROOC(CH$_2$)$_n$COOR | | 9 | 16.2 | 4.7 | 8.4 | 8.01 | 4.90 | 8.99 | -3.11 | 0.98 |
| 3 | | | 10 | 16.2 | 5 | 9 | 8.51 | 4.56 | 9.49 | -3.95 | 0.98 |
| 4 | | Methyl | 5 | 16.1 | 7.7 | 8.3 | 8.92 | 2.13 | 9.79 | -6.79 | 0.87 |
| 5 | | | 6 | 16.3 | 6.8 | 8.5 | 8.87 | 3.01 | 9.78 | -5.86 | 0.91 |
| 6 | | | 10 | 16.6 | 2.9 | 6.7 | 7.38 | 7.21 | 8.33 | -0.17 | 0.94 |
| 7 | | Ethyl | 5 | 16.3 | 7 | 7.8 | 8.52 | 3.07 | 9.41 | -5.45 | 0.89 |
| 8 | | | 6 | 16.4 | 6.2 | 7.5 | 8.14 | 3.92 | 9.05 | -4.22 | 0.91 |
| 9 | | | 10 | 16.2 | 4.1 | 5 | 5.95 | 6.81 | 6.83 | 0.85 | 0.87 |
| 10 | | Octyl | 6 | 16.7 | 2 | 5.1 | 6.92 | 8.69 | 7.77 | 1.77 | 0.85 |
| 11 | | | 8 | 16.1 | 2.7 | 3.4 | 5.26 | 8.85 | 6.00 | 3.59 | 0.74 |
| 12 | | | 10 | 16.1 | 3.1 | 3.5 | 5.26 | 8.49 | 6.02 | 3.23 | 0.76 |
| 13 | | Benzyl | 10 | 17.8 | 2.2 | 5.5 | 9.09 | 9.17 | 9.92 | 0.08 | 0.83 |
| 14 | | | 6 | 17.8 | 3.8 | 5.1 | 8.96 | 8.17 | 9.77 | -0.79 | 0.81 |
| 15 | | | 8 | 17.5 | 3.6 | 4.8 | 8.29 | 8.16 | 9.09 | -0.13 | 0.80 |
| 16 | | Pentadecyl | 6 | 16.1 | 2.4 | 2.5 | 5.25 | 9.67 | 5.87 | 4.42 | 0.62 |
| 17 | | | 8 | 16 | 2.4 | 2.6 | 5.05 | 9.59 | 5.69 | 4.54 | 0.64 |
| 18 | | | 10 | 16.1 | 2.2 | 2.4 | 5.29 | 9.89 | 5.89 | 4.60 | 0.60 |

Polyol Ester Oil

TABLE 3

| Ex. | Name | $\delta_d$ | $\delta_p$ | $\delta_h$ | $Ra_{1123}$ | $Ra_{32}$ | $Ra_{1234yf}$ | $Ra_{32}$-$Ra_{1123}$ | $Ra_{1234yf}$-$Ra_{1123}$ |
|---|---|---|---|---|---|---|---|---|---|
| 19 | Trimethylolpropane tripelargonate | 16.5 | 2 | 2.8 | 6.10 | 9.88 | 6.75 | 3.78 | 0.65 |
| 20 | Triethylolpropane tripelargonate | 16.6 | 2 | 2.9 | 6.30 | 9.86 | 6.96 | 3.56 | 0.66 |
| 21 | Trimethylolethane 2-ethylhexanoate | 16.4 | 1.5 | 2.6 | 6.02 | 10.35 | 6.63 | 4.34 | 0.62 |
| 22 | Trimethylolpropane 2-ethylhexanoate | 16.3 | 1.5 | 2.4 | 5.83 | 10.45 | 6.42 | 4.62 | 0.59 |
| 23 | Pentaerythritol 2-ethylhexanoate | 16.6 | 1.4 | 2.1 | 6.46 | 10.82 | 7.01 | 4.36 | 0.56 |

(Polyglycol Lubricating Oil)

TABLE 4

| Ex | Name and structural formula | R | n in structural formula | $\delta_d$ | $\delta_p$ | $\delta_h$ | $Ra_{1123}$ | $Ra_{32}$ | $Ra_{1234yf}$ | $Ra_{32}$-$Ra_{1123}$ | $Ra_{1234yf}$-$Ra_{1123}$ |
|---|---|---|---|---|---|---|---|---|---|---|---|
| 24 | Polyalkylene glycol | Methyl | 3 | 15.3 | 5.5 | 10.4 | 8.83 | 4.15 | 9.78 | -4.68 | 0.95 |
| 25 | RO—(CH$_2$CH(CH$_3$)O)$_n$—H | | 6 | 15.5 | 6.1 | 5.8 | 5.88 | 4.67 | 6.74 | -1.21 | 0.85 |
| 26 | | | 10 | 14.4 | 6.4 | 4.8 | 4.31 | 5.77 | 5.01 | 1.46 | 0.70 |
| 27 | | Hexyl | 3 | 15.9 | 5 | 6.4 | 6.35 | 5.20 | 7.28 | -1.15 | 0.93 |
| 28 | | | 6 | 15.3 | 5.3 | 5 | 4.81 | 5.83 | 5.66 | 1.02 | 0.86 |
| 29 | | | 10 | 14.2 | 5.9 | 4.4 | 3.56 | 6.49 | 4.25 | 2.93 | 0.69 |
| 30 | | Decyl | 3 | 15.8 | 4.4 | 5.3 | 5.44 | 6.29 | 6.35 | 0.85 | 0.91 |
| 31 | | | 6 | 15.2 | 4.9 | 4.5 | 4.25 | 6.48 | 5.10 | 2.24 | 0.85 |
| 32 | | | 10 | 14.4 | 5.6 | 4.2 | 3.15 | 6.89 | 3.84 | 3.74 | 0.69 |

TABLE 5

| Ex. | Name and structure | Degree of polymerization m | n | $\delta_D$ | $\delta_P$ | $\delta_H$ | $Ra_{1123}$ | $Ra_{32}$ | $Ra_{1234yf}$ | $Ra_{32}-Ra_{1123}$ | $Ra_{1234yf}-Ra_{1123}$ |
|---|---|---|---|---|---|---|---|---|---|---|---|
| 33 | Polyoxyethylene propylene glycol | 5 | 1 | 15.3 | 5.7 | 5.8 | 5.42 | 4.99 | 6.29 | −0.42 | 0.86 |
| 34 | monopropyl ether | 1 | 5 | 15.3 | 6.5 | 8.5 | 7.63 | 3.02 | 8.53 | −4.60 | 0.90 |
| 35 | $C_3H_7O-(CH_2CH_2O)_m(CH_2CH(CH_3)O)_n-H$ | 15 | 15 | 8.2 | 10.4 | 10.4 | 15.00 | 14.89 | 15.02 | −0.11 | 0.02 |
| 36 | | 15 | 5 | 10.2 | 9.1 | 10.1 | 11.59 | 10.85 | 11.80 | −0.74 | 0.21 |
| 37 | | 5 | 15 | 10.3 | 10 | 9.8 | 11.79 | 10.64 | 11.99 | −1.15 | 0.20 |
| 38 | Polyoxyethylene propylene glycol | 1 | 5 | 15.7 | 7.3 | 8.1 | 8.13 | 2.33 | 9.00 | −5.80 | 0.87 |
| 39 | $H-(CH_2CH_2O)_m(CH_2CH(CH_3)O)_n-H$ | 5 | 1 | 15.7 | 8.4 | 12 | 11.57 | 3.07 | 12.45 | −8.50 | 0.88 |
| 40 | | 15 | 15 | 8.2 | 11 | 8.5 | 14.44 | 14.90 | 14.35 | 0.46 | −0.08 |
| 41 | | 5 | 15 | 11.2 | 8.9 | 5 | 7.75 | 9.72 | 7.70 | 1.97 | −0.05 |
| 42 | | 15 | 5 | 10.3 | 10 | 9.8 | 11.79 | 10.64 | 11.99 | −1.15 | 0.20 |
| 43 | Polyoxypropylene glycol monopropyl ether | — | 6 | 15.3 | 5.6 | 5.2 | 5.05 | 5.48 | 5.90 | 0.43 | 0.85 |
| 44 | $C_3H_7O-(CH_2CH(CH_3)O)_n-H$ | — | 10 | 13.9 | 6.2 | 4.3 | 3.58 | 6.70 | 4.16 | 3.12 | 0.58 |
| 45 | | — | 16 | 12.3 | 7.1 | 4.5 | 5.00 | 8.37 | 5.10 | 3.37 | 0.10 |
| 46 | | — | 22 | 10.7 | 8.2 | 5.2 | 7.98 | 10.62 | 7.87 | 2.64 | −0.11 |
| 47 | | — | 27 | 10 | 9 | 5.9 | 9.70 | 11.66 | 9.58 | 1.96 | −0.12 |

(Fluorinated Lubricating Oil)

TABLE 6

| Ex. | Name | $\delta_D$ | $\delta_P$ | $\delta_H$ | $Ra_{1123}$ | $Ra_{32}$ | $Ra_{1234yf}$ | $Ra_{32}-Ra_{1123}$ | $Ra_{1234yf}-Ra_{1123}$ |
|---|---|---|---|---|---|---|---|---|---|
| 48 | Polychlorotrifluoroethylene (degree of polymerization: 3) | 13.7 | 2.1 | 0.4 | 2.54 | 11.98 | 11.28 | 9.44 | 8.74 |
| 49 | Polychlorotrifluoroethylene (degree of polymerization: 7) | 13.1 | 1.7 | 0 | 3.14 | 12.93 | 12.65 | 9.78 | 9.50 |
| 50 | Polychlorotrifluoroethylene (degree of polymerization: 10) | 12.4 | 2.5 | 0 | 3.53 | 13.09 | 10.09 | 9.56 | 6.56 |

(Hydrocarbon Lubricating Oil)

TABLE 7

| Ex. | Name and structural formula | R | n | $\delta_D$ | $\delta_P$ | $\delta_H$ | $Ra_{1123}$ | $Ra_{32}$ | $Ra_{1234yf}$ | $Ra_{32}-Ra_{1123}$ | $Ra_{1234yf}-Ra_{1123}$ |
|---|---|---|---|---|---|---|---|---|---|---|---|
| 51 | Poly-α-olefin | Methyl | 3 | 15 | 0 | 0 | 5.09 | 13.14 | 5.12 | 8.05 | 0.03 |
| 52 | $H(CH(R)CH_2)_nH$ | Hexyl | | 15.9 | 0 | 0 | 6.32 | 13.10 | 6.51 | 6.78 | 0.19 |
| 53 | | Decyl | | 15.9 | 0 | 0 | 6.32 | 13.10 | 6.51 | 6.78 | 0.19 |
| 54 | | Methyl | 6 | 15.6 | 0 | 0 | 5.88 | 13.08 | 6.02 | 7.21 | 0.14 |
| 55 | | Hexyl | | 15.7 | 0 | 0 | 6.02 | 13.08 | 6.18 | 7.06 | 0.16 |
| 56 | | Decyl | | 16.2 | 0 | 0 | 6.79 | 13.14 | 7.02 | 6.35 | 0.23 |
| 57 | | Methyl | 10 | 15.6 | 0 | 0 | 5.88 | 13.08 | 6.02 | 7.21 | 0.14 |
| 58 | | Hexyl | | 15.8 | 0 | 0 | 6.17 | 13.09 | 6.35 | 6.92 | 0.18 |
| 59 | | Decyl | | 18.9 | 0 | 0 | 11.56 | 14.65 | 11.97 | 3.10 | 0.41 |

(Ether Lubricating Oil)

TABLE 8

| Ex. | Name and structural formula | $\delta_d$ | $\delta_p$ | $\delta_h$ |
|---|---|---|---|---|
| 60 | m-Bis(m-phenoxyphenoxy)benzene | 19.9 | 4.9 | 4.6 |

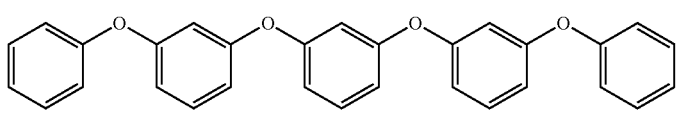 [SMILES: c1ccc(Oc2cccc(Oc3cccc(Oc4cccc(Oc5ccccc5)c4)c3)c2)cc1]

TABLE 8-continued

| 61 | m-Phenoxyphenoxy m-biphenyl | | 19.8 | 2.9 | 3.4 |

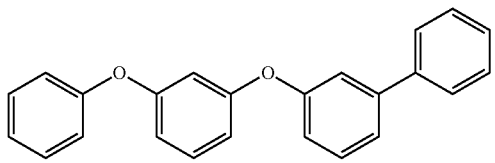 [SMILES: c1ccc(Oc2cccc(Oc3cccc(-c4ccccc4)c3)c2)cc1]

| Ex. | $Ra_{1123}$ | $Ra_{32}$ | $Ra_{1234yf}$ | $Ra_{32}$-$Ra_{1123}$ | $Ra_{1234yf}$-$Ra_{1123}$ |
|---|---|---|---|---|---|
| 60 | 13.06 | 10.70 | 13.79 | −2.37 | 0.72 |
| 61 | 12.62 | 12.05 | 13.29 | −0.57 | 0.67 |

(Evaluation of Self-decomposition Property)

The self-decomposition property was evaluated in equipment in accordance with method A recommended as equipment for measurement of the combustion range of a gas mixture containing halogen, by individual notifications in High Pressure Gas Safety Act.

Comparative Examples 1 to 3

Each of mixed working fluids containing HFO-1123, HFC-32 and HFO-1234yf in mass ratios of 60/40/0, 50/40/10 and 60/10/30, was enclosed in a spherical pressure resistant reactor having an internal capacity of 650 cm$^3$ and having a temperature in the interior controlled to be within a range of from 190° C. to 210° C. by a heater from the outside, to a pressure of 4.45 MPa by the gauge pressure.

Then, a platinum wire (outer diameter: 0.5 mm, length: 25 mm) placed in the spherical pressure resistant reactor was fused under a voltage of 10 V at an electric current of 50 A (hot wire method). The temperature and pressure changes in the pressure resistant reactor after fusing were measured. Further, the gas composition after the test was analyzed. In a case where after the test, a pressure increase and a temperature increase in the spherical pressure resistant reactor were confirmed, and a self-decomposition reaction product ($CF_4$, HF, coke) in an amount of at least 20 mol % based on 100 mol % of HFO-1123 charged was detected by the gas analysis after the test, such a case was evaluated that self-decomposition reaction occurred. The results are shown in Table 9.

Examples 1 to 3

The self-decomposition property was evaluated in the same manner as in Comparative Examples 1 to 3 except that before the working fluid was put into the spherical pressure resistant reactor, 100 parts by mass of polychlorotrifluoroethylene (degree of polymerization: 10) based on 100 parts by mass of the working fluid was put. The results are shown in Table 9.

TABLE 9

| | Working fluid (100 parts by mass) Working fluid composition | | | Lubricating oil Type Polychloro- | |
|---|---|---|---|---|---|
| | HFO-1123 (mass %) | HFC-32 (mass %) | HFO-1234yf (mass %) | trifluoroethylene (degree of polymerization: 10) | Self-decomposition reaction |
| Example 1 | 60 | 40 | 0 | 100 parts by mass | Nil |
| Example 2 | 50 | 40 | 10 | 100 parts by mass | Nil |
| Example 3 | 60 | 10 | 30 | 100 parts by mass | Nil |
| Comparative Example 1 | 60 | 40 | 0 | Nil | Occurred |
| Comparative Example 2 | 50 | 40 | 10 | Nil | Occurred |
| Comparative Example 3 | 60 | 10 | 30 | Nil | Occurred |

INDUSTRIAL APPLICABILITY

The composition for a heat cycle system and a heat cycle system employing the composition of the present invention are useful for a refrigerator (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

REFERENCE SYMBOLS

10: refrigerating cycle system, 11: compressor, 12: condenser, 13: expansion valve, 14: evaporator, 15, 16: pump.

What is claimed is:

1. A composition for a heat cycle system, comprising: a working fluid comprising trifluoroethylene and difluoromethane; and a lubricating oil, wherein the lubricating oil is selected from the group consisting of: a dibasic acid ester oil; a polychlorotrifluoroethylene having a degree of polymerization of from 3 to 10; a hydrocarbon synthetic oil which is a poly-α-olefin represented by $H(CH(R)CH_2)_nH$, where R is an alkyl group having 1 to 10 carbon atoms, and n is an integer of from 3 to 10; and a combination thereof, such that the interaction distance ($Ra_{1123}$) between trifluoroethylene and the lubricating oil as determined from the Hansen solubility parameters is shorter than the interaction distance ($Ra_{32}$) between difluoromethane and the lubricating oil, and
wherein the total amount of trifluoroethylene and difluoromethane in the working fluid is at least 90 mass % per 100 mass % of the working fluid.

2. The composition for a heat cycle system according to claim 1, wherein the difference ($Ra_{32}$-$Ra_{1123}$) between the interaction distance ($Ra_{1123}$) and the interaction distance ($Ra_{32}$) is at least 1.

3. The composition for a heat cycle system according to claim 1, wherein the mass ratio of the working fluid to the lubricating oil is from 1/10 to 10/1.

4. The composition for a heat cycle system according to claim 1, wherein the mass ratio (trifluoroethylene/difluoromethane) of trifluoroethylene to difluoromethane in the working fluid is from 1/99 to 99/1.

5. The composition for a heat cycle system according to claim 1, wherein the proportion of the content of trifluoroethylene in the working fluid is at least 10 mass % based on the entire amount of the working fluid.

6. The composition for a heat cycle system according to claim 1, wherein the working fluid further comprises at least one hydrofluoroolefin selected from 2,3,3,3-tetrafluoropropene, trans-1,3,3,3-tetrafluoropropene and cis-1,3,3,3-tetrafluoropropene.

7. The composition for a heat cycle system according to claim 6, wherein the interaction distance between the hydrofluoroolefin and the lubricating oil is equal to or longer than the interaction distance ($Ra_{1123}$) between trifluoroethylene and the lubricating oil.

8. The composition for a heat cycle system according to claim 1, wherein the working fluid further comprises 2,3,3,3-tetrafluoropropene.

9. The composition for a heat cycle system according to claim 8, wherein the difference ($Ra_{1234yf}$-$Ra_{1123}$) between the interaction distance ($Ra_{1234yf}$) between 2,3,3,3-tetrafluoropropene and the lubricating oil and the interaction distance ($Ra_{1123}$) is at least 0.

10. A heat cycle system, comprising the composition for a heat cycle system as defined in claim 1.

11. The heat cycle system according to claim 10, wherein the heat cycle system is a refrigerating apparatus, an air-conditioning apparatus, a power generation system, a heat transport apparatus or a secondary cooling machine.

12. The composition for a heat cycle system according to claim 1, wherein the interaction distance ($Ra_{1123}$) between trifluoroethylene and the lubricating oil is from 0 to 9.

13. The composition for a heat cycle system according to claim 1, wherein the interaction distance ($Ra_{1123}$) between trifluoroethylene and the lubricating oil is from 0 to 3.

14. The composition for a heat cycle system according to claim 1, wherein the interaction distance ($Ra_{32}$) between difluoromethane and the lubricating oil is at least 6.

15. The composition for a heat cycle system according to claim 1, wherein the interaction distance ($Ra_{32}$) between difluoromethane and the lubricating oil is at least 12.

16. The composition for a heat cycle system according to claim 1, wherein the difference ($Ra_{32}$-$Ra_{1123}$) between the interaction distance ($Ra_{1123}$) and the interaction distance ($Ra_{32}$) is at least 3.

17. The composition for a heat cycle system according to claim 1, wherein the difference ($Ra_{32}$-$Ra_{1123}$) between the interaction distance ($Ra_{1123}$) and the interaction distance ($Ra_{32}$) is at least 6.

18. The composition for a heat cycle system according to claim 1, wherein the dibasic acid ester oil is an ester of a $C_{5-10}$ dibasic acid with a $C_{2-15}$ monohydric alcohol.

19. The composition for a heat cycle system according to claim 1, wherein the mass ratio of trifluoroethylene to difluoromethane (trifluoroethylene/difluoromethane) is from 20/80 to 80/20, and the mass ratio of the working fluid to the lubricating oil (the working fluid/the lubricating oil) is from 1/3 to 3/1.

20. The composition for a heat cycle system according to claim 1, wherein the lubricating oil is selected from the group consisting of: a dibasic acid ester oil; a polychlorotrifluoroethylene having a degree of polymerization of from 3 to 10; and a combination thereof.

* * * * *